(12) United States Patent
Wang et al.

(10) Patent No.: US 6,756,988 B1
(45) Date of Patent: *Jun. 29, 2004

(54) DISPLAY FIFO MEMORY MANAGEMENT SYSTEM

(75) Inventors: Chun Wang, North York (CA); Raymond Li, Markham (CA); Adrian Hartog, Toronto (CA); Daniel Gudmundson, Newmarket (CA)

(73) Assignee: ATI International SRL, Christchurch (BB)

( * ) Notice: Subject to any disclaimer, the term of this patent is extended or adjusted under 35 U.S.C. 154(b) by 0 days.

This patent is subject to a terminal disclaimer.

(21) Appl. No.: 09/369,784

(22) Filed: Aug. 6, 1999

Related U.S. Application Data

(63) Continuation of application No. 08/885,248, filed on Jun. 30, 1997, now Pat. No. 5,953,020.

(51) Int. Cl.⁷ .................................................. G09G 5/36
(52) U.S. Cl. ........................ 345/558; 345/531; 345/534; 345/535
(58) Field of Search ................................ 345/535, 531, 345/534, 558

(56) References Cited

U.S. PATENT DOCUMENTS

| | | | | |
|---|---|---|---|---|
| 5,506,809 A | | 4/1996 | Csoppenszky et al. | |
| 5,617,118 A | * | 4/1997 | Thompson | 345/537 |
| 5,717,440 A | * | 2/1998 | Katsura et al. | 345/501 |
| 5,767,866 A | * | 6/1998 | Chee et al. | 345/535 |
| 5,804,986 A | * | 9/1998 | Jones | 326/39 |
| 5,953,020 A | * | 9/1999 | Wang et al. | 345/501 |

* cited by examiner

Primary Examiner—Matthew C. Bella
Assistant Examiner—Antonio Caschera
(74) Attorney, Agent, or Firm—Vedder, Price, Kaufman & Kammholz, P.C.

(57) ABSTRACT

A display FIFO memory management system and method includes a programmable FIFO emulator for emulating a drain and fill time of the display FIFO memory to automatically predict a number of register entries remaining in the display FIFO memory at each predefined clock cycle. A programmable timer/counter has programmable precision to accommodate varying bandwidths of display screen display modes and is used to determine the number of entries remaining so that the emulator can accommodate varying screen display modes. A FIFO controller controls the timing of fetching display data from memory to fill the display FIFO memory based on the prediction of the number of remaining register entries in the display FIFO by the programmable emulator.

17 Claims, 7 Drawing Sheets

DISPLAY FIFO MEMORY MANAGEMENT SYSTEM

CROSS REFERENCE TO RELATED APPLICATION

This is a continuation application of an application entitled "Display FIFO Management System" filed on Jun. 30, 1997, having Ser. No. 08/885,248, now U.S. Pat. No. 5,953,022, having the same inventors as instant application, and owned by instant assignee.

BACKGROUND OF THE INVENTION

The invention relates generally to memory control devices and methods and more particularly to screen display FIFO memory management systems and methods. One of the recent trends in high performance graphics chip design requires support of graphic display modes with high resolutions (up to 1600×1200), high screen refresh rates (up to 200 Hz), and high color depth (24 bit or 32 bit true color). The combination of high resolution, high refresh rates and high color depth requires a very high memory bandwidth to perform proper screen refreshes. A display mode of 1152× 864×32 bpp@75 Hz, for example, requires a memory bandwidth of 440 Mb/s for screen refreshes. To meet such a high memory bandwidth requirement, new high performance memories like SDRAM's are typically required for frame buffer memory. Equally important is the design of high performance memory controllers that can take advantage of the high performance of such new memories.

A display FIFO memory (buffer) is usually implemented in graphics chips to buffer the data for screen refreshes. The role of this display FIFO memory is two-fold. The first is to sustain a long burst read of display data from the frame buffer memory, so that a high memory read efficiency can be achieved, and the second is to allow the screen refresh unit to tolerate memory access latencies while the memory controller services other requests from requesters in the graphics chip, such as the GUI engine for example. The display FIFO memory in a graphics chip is usually made up of a SRAM macro cell of 8 to 32 entries with each entry 32 or 64 bits wide. The display FIFO is a precious resource in a graphics chip since it can occupy a significant amount of chip area. Hence there is a continuing need for memory controllers that can use minimum amounts of the display FIFO memory entries while also supporting required high bandwidth display modes.

Displays must receive screen refresh data in real time to avoid loss of screen resolution. The screen refresh unit therefore generates a real time refresh request from the memory controller. With higher resolution display modes, it is important to meet the requirement of both the memory bandwidth and an allowable memory access latency period.

Generally, filling and draining of display FIFO memory entries occurs at the same time. The display receives the refresh data in bursts to free up the memory for use by other requests in hardware. A FIFO controller typically determines how man entries remain in the FIFO memory and how many entries to fill to facilitate proper refresh of the display.

However, the display FIFO memory read rates and writes rates are different resulting in two clock domains. The read rate to drain the display FIFO memory is based on the video clock rate (VCLK) at which the display screen requires refresh data. Reading data from the display FIFO to the screen can be on the order of 100 Mb/sec. In contrast, the write rate to fill the display FIFO is based on the memory clock (XCLK) since the memory clock is used to retrieve data from memory. Display FIFO memory write or fill rates can be 800 Mb/sec so that the FIFO memory entries are filled faster than they are drained.

In conventional memory controllers, display FIFO memory management systems perform a conversion of the two different clock domains by analyzing the location of the read and write pointers of the FIFO memory to determine how many entries have been drained. The read pointer keeps track of how much data has been read from the FIFO memory by the screen refresh unit. The write pointer keeps track of how many entries of data have been filled in the FIFO memory by the memory controller. A comparator is used to compare the read and write pointers to determine how many FIFO memory entries are left over in the FIFO memory at any given time. When the difference between the two pointers is greater than a pre-defined value, a so called low watermark, the FIFO control circuitry start to generate requests to the memory controller to request more data to fill the FIFO memory, As the FIFO memory fills, the difference between the read and write pointer becomes smaller and smaller. When the difference between the read and write pointer become zero, the FIFO is full, and FIFO control circuitry stops requesting data from memory controller.

One major shortcoming of the conventional FIFO memory management scheme is that it can not make use of every entry of the display FIFO memory. For example, re-synchronization can waste up to 2 entries. Since the read and write pointers are on two different clock domains, (the read pointer is in the screen refresh clock (VCLK) domain, and the write pointer is in the memory clock (XCLK) domain) one of the pointers has to be brought across the clock boundary to the other clock domain in order to compare them. It can take one clock cycle to make the conversion resulting, in a re-synchronization error. To avoid an underflow condition, an extra entry is typically added to the low watermark to compensate for the one clock re-synchronization uncertainty. Also because of this uncertainty, the FIFO memory full point is also typically lowered by one entry in order to prevent FIFO memory overflow.

Moreover, high performance memory controllers usually use pipeline designs to increase memory interface speed. A three stage pipeline memory controller needs three clock cycles to process a FIFO memory fill request. The latency between the memory, controller accepting a request and data coming back can cost up to three entries in the display FIFO memory. This is because the write pointer is incremented according to the ready signal sent back by the memory controller, and when the comparator shows that the FIFO memory is full and turns off the request, the last piece of data does not come back until three clocks later, during which time the FIFO memory has already drained several entries. Therefore, the FIFO memory is never actually filled to capacity at any time. The actual number of entries that are wasted due to the FIFO memory never filling to capacity depends on the memory type and screen display modes. The higher the display bandwidth requirement, the more entries that are typically wasted. Also an SDRAM generally wastes more entries than a DRAM, because an SDRAM fills at a rate of one entry per clock cycle. In the case of a very with bandwidth display mode the drain rate is almost equal to the fill rate, so the drain rate is also close to one. Consequently every clock latency can waste an entry in FIFO memory. In conventional display FIFO management systems, the FIFO is typically made larger to compensate for the error by allowing more space for overflow to occur. Unnecessarily increasing the size of the display FIFO uses up valuable chip area and increases the cost of the graphics system.

In addition, the wasting of display FIFO memory entries can hurt the performance of a graphics chip. First the loss of FIFO memory entries makes the burst reading length shorter for the filling of the display FIFO memory. The shorter burst reading length lowers the efficiency of memory bandwidth usage for a screen refresh. The lowering in memory bandwidth usable often means the screen refresh operation needs more row memory bandwidth than ordinarily required to support the same display mode. Therefore, other functions of the graphics chip like the GUI engine, the video capture function and other functions, receive less memory bandwidth, so that the performance of the graphics chip as a whole decreases. Second, the shrinking of the effective display FIFO memory reduces its ability to tolerate memory, access latencies. This has the most profound effect at high bandwidth display modes since, the full size of display FIFO memory is typically marginally large enough to tolerate the memory access latency period. Any wasting of display FIFO memory entries can risk losing the support of higher resolution display modes. Consequently, there exists a need for an improved display FIFO memory management system that substantially overcomes one or more of the above problems.

BRIEF DESCRIPTION OF THE DRAWINGS

The features of the present invention together with the advantages thereof, may be understood by reference to the following description taken in conjunction with the accompanying drawings wherein.

DETAILED DESCRIPTION OF THE INVENTION

The disclosed invention, among other features, incorporates a virtual type of display FIFO memory to emulate the fill and drain timing of the actual display FIFO memory to automatically determine the entry state of the actual FIFO memory. This results in substantially eliminating the error and delay found in conventional display FIFO memory management systems.

Figure 1:
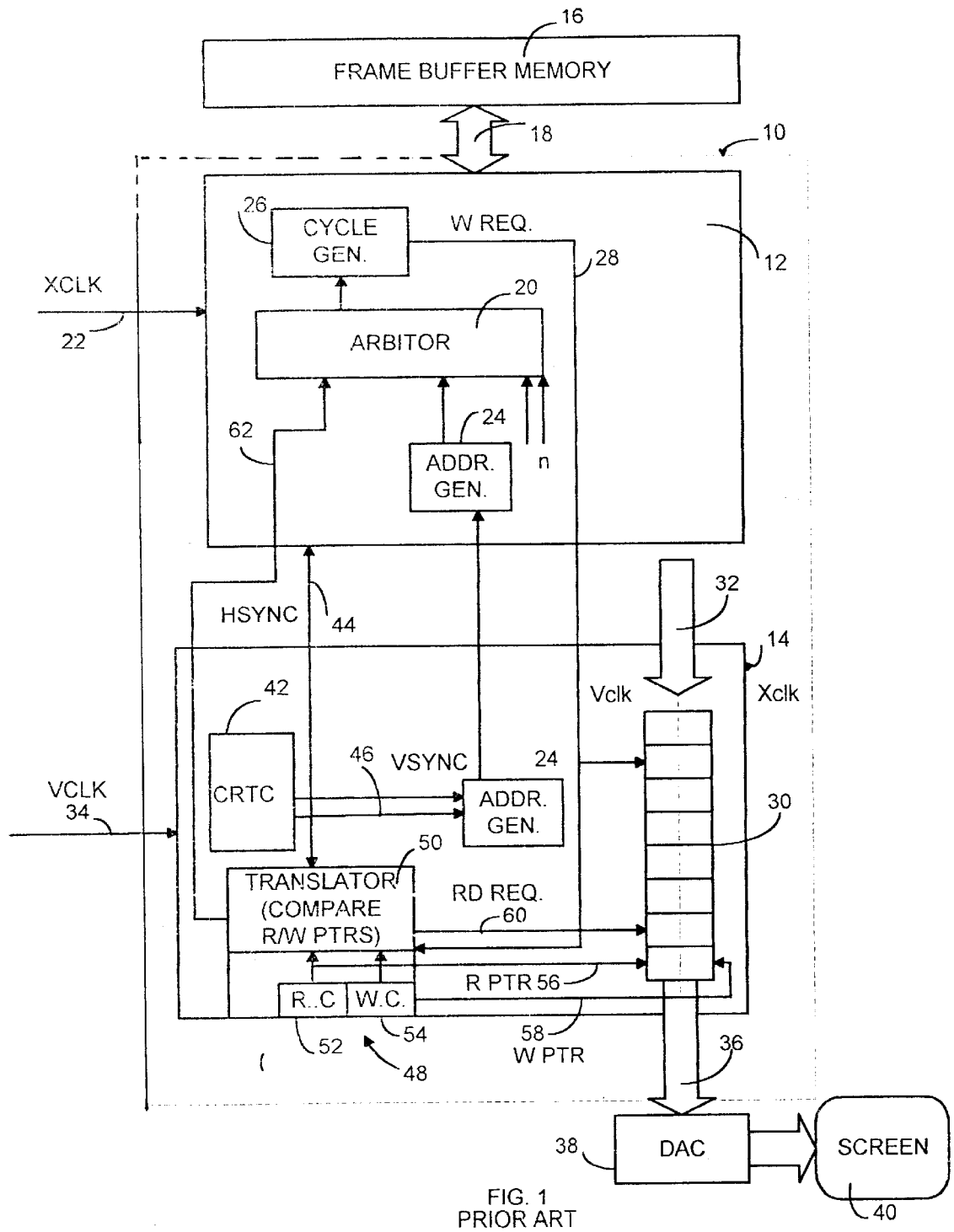
FIG. 1 is a block diagram generally depicting a memory controller having a conventional display FIFO memory management system.

FIG. 1 shows a conventional graphics chip 10 having a memory controller block 12 and a display FIFO controller block 14 implementing a conventional display FIFO memory management system. The graphics chip 10 interfaces with frame buffer memory 16 through memory interface 18 as known in the art. The memory controller 12 accesses the frame buffer memory based on request signals from arbitor 20. A memory clock input 22 (XCLK) is used by the memory controller 12 for accessing frame buffer memory 16 as known in the art.

The memory controller 12 also includes address generator 24 for generating the proper address for, the necessary data to be retrieved from frame buffer memory 16. In addition memory controller 12 includes a cycle generator 26 for outputting various requests, including a write request signal 28 to write data from memory 16 to the FIFO controller 14. The display FIFO controller 14 includes display FIFO memory 30 which may be a SRAM macro cell of 8 to 32 entries with each entry either 32 bits or 64 bits wide. Memory controller 12 sends memory data to fill the FIFO 30 in response to the write request signal 28.

The display FIFO controller 14 uses a video clock input (VCLK) 34 as the timing basis for generating screen refresh read requests to the display FIFO memory 30. Hence, the graphics chip 10 has a dual domain clock-structure based on XCLK 22 and VCLK 34. Upon a screen refresh read request, the display FIFO controller 14 sends FIFO data 36 to a digital to analog converter 38 which converts digital control data and pixel data to analog information for display on display screen 40. Based on the size of screen 40 and other factors, its display mode will dictate the refresh rate for that particular screen 40.

As known in the art, a CRT controller 42 generates horizontal sync signal (HSYNC) 44 and vertical sync (VSYNC) 46 for use by the memory controller 12, address generator 24 and FIFO translator block 48. The display FIFO translator block 48 includes a translator unit 50 that translates one clock domain into another clock domain so that the read and write pointers can be compared to determine how many display FIFO entries are leftover in the display FIFO at any given time, as known in the art. The display FIFO translator block 48 also includes a conventional read controller 52 and write controller 54. The read controller 52 generates the read pointer 56 which indicates the last entry sent as FIFO data 36 to screen 40. Likewise, write controller 54 generates a write pointer 8 indicating the last entry that received the memory data 32.

The CRTC 42 series as the refresh request unit. Accordingly, the translator unit 50 generates a display FIFO memory read request signal 60 when the screen requires additional refresh FIFO data. In addition, the translator unit 50 compares the translated read/write pointer information to generate a display memory read request signal 62 requesting that additional data from frame buffer memory 16 be written to display FIFO memory 30 to fill the FIFO entries. By translating the pointers and comparing the results, the translator unit 50 introduces unnecessary re-synchronization error and typically requires an increase in SRAM display FIFO memory storage capacity as previously discussed.

Figure 2:
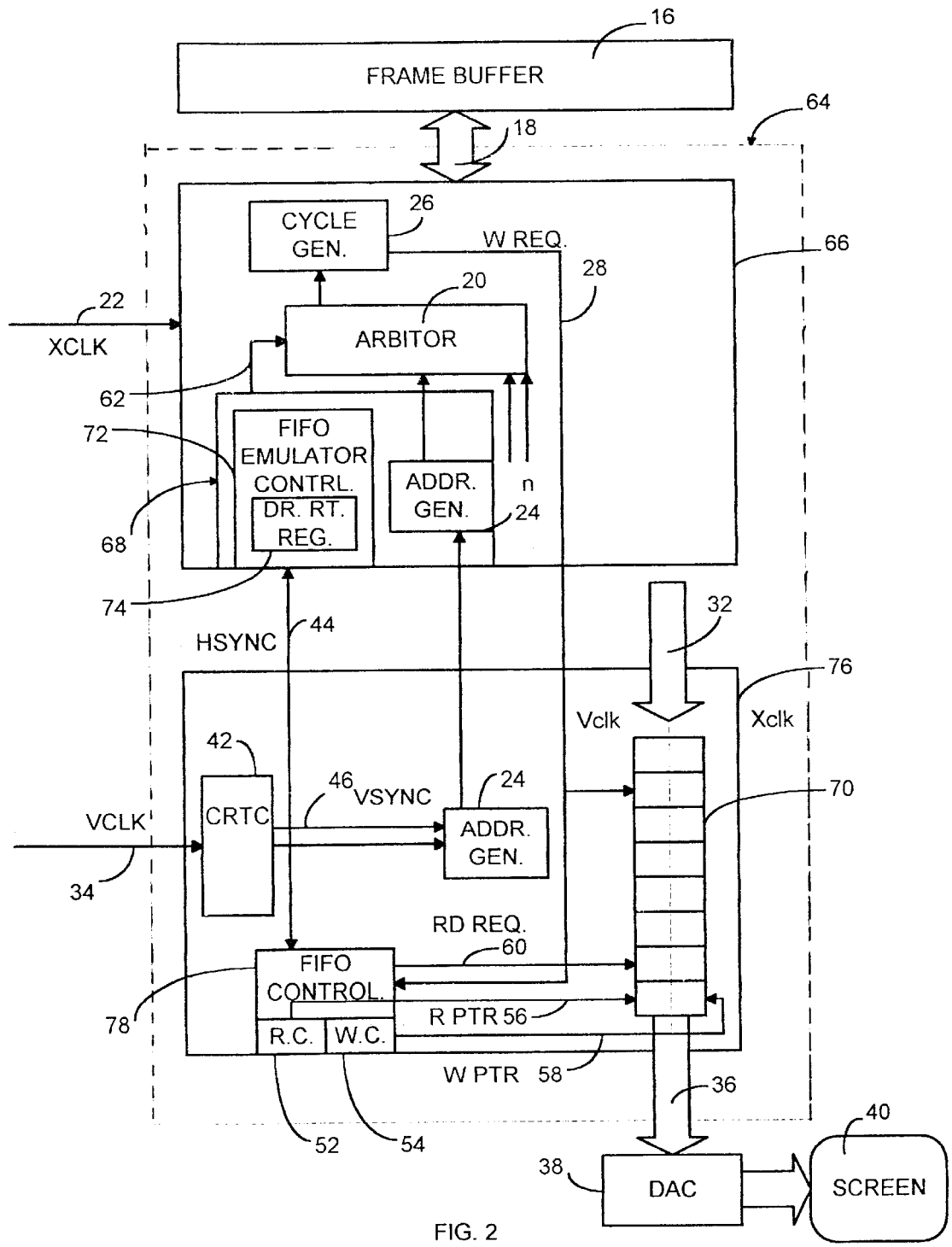
FIG. 2 is a block diagram generally depicting one embodiment of a FIFO memory management system in accordance with the invention.

FIG. 2 shows one embodiment of a display FIFO management system that eliminates the need for the translator unit 50 (FIG. 1) by reducing re-synchronization error and reducing required display FIFO memory size. It will be recognized by those of ordinary skill in the art that the blocks labeled and described herein may have overlapping functionality or be combined to accommodate functionalities of many differing blocks depending on the architecture of the memory chip and the desired design results. For purposes of illustration, the same reference numerals will be used to indicate the same functional blocks.

A graphics chip 64 includes a memory controller 66 having a programmable virtual FIFO controller 68 that emulates a drain and fill time of an actual display FIFO memory 70 to automatically predict the number of register entries remaining in the display FIFO memory 70 at each predefined clock cycle. The virtual FIFO controller 68 is a system having software and hardware components and controls the timing of write request 28 to the display FIFO memory 70 based on the prediction of the number of remaining register entries. This control is accomplished when the virtual FIFO controller 68 generates tile display memory read request signal 62 based on the emulation of the drain and fill time of the display FIFO memory 70. The virtual FIFO controller 68 includes programmable FIFO memory emulator 72 which accesses a programmable drain rate register 74 for use in predicting a number of register entries remaining in the display FIFO memory 70 as further described below.

The graphics chip 64 also includes a FIFO controller 76 having a FIFO control block 78 that generates the read request signal 60 and read pointer 56 and write pointer 58 signals similar to the FIFO controller block 48 of FIG. 1. However, the FIFO control block 78 does not have translation and comparison mechanism for comparing the read pointer and write pointer. Also, the HSYNC signal 44 is a derivative signal of an actual horizontal sync pulse. HSYNC 44 is the equivalent of a pulse stream representing an active area between actual horizontal sync pulses. In other words, the signal represents the scan line area with all blank areas removed and all control data removed to reflect active area between two actual horizontal sync pulses.

Figure 3:
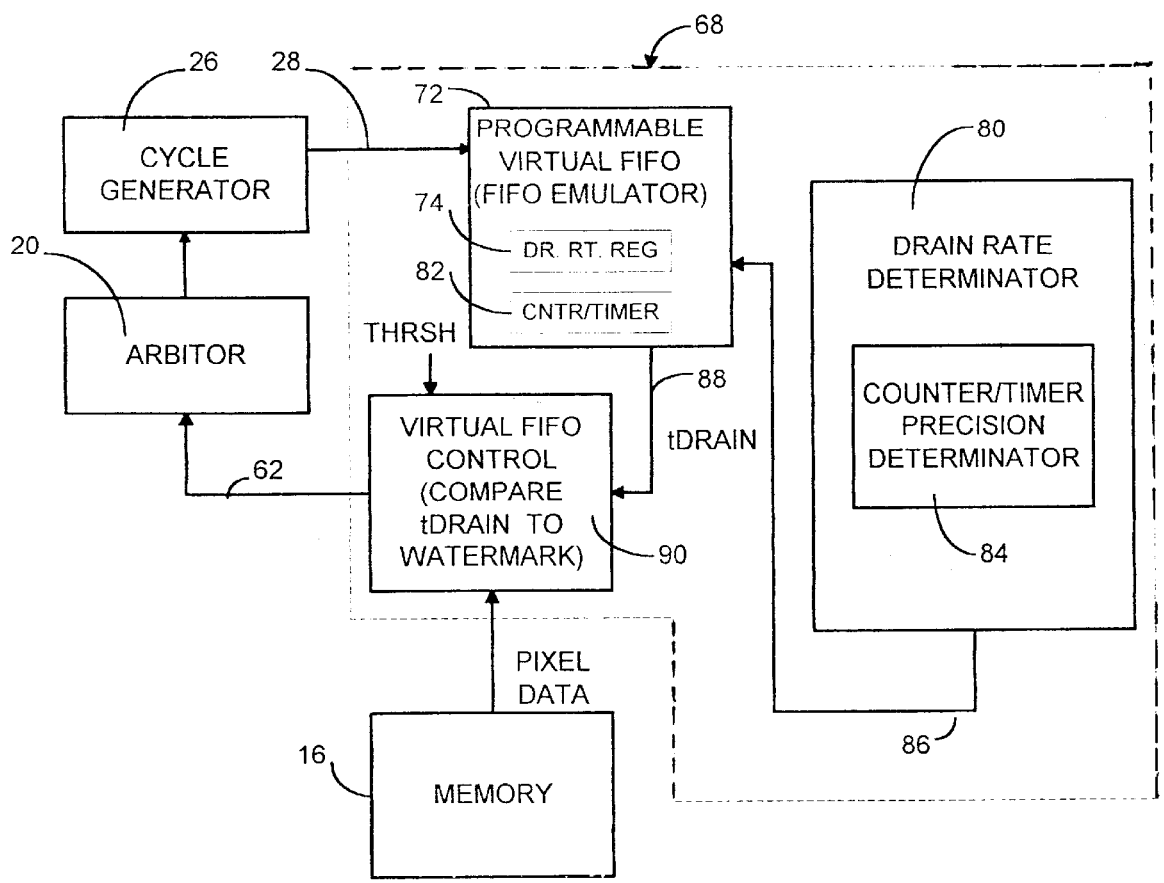
FIG. 3 is a general block diagram depicting in more detail a virtual FIFO controller in accordance with the invention.

Referring to FIG. 3, the virtual FIFO controller 68 serves as a virtual FIFO memory in the sense that an output (tDRAIN) generated from the programmable FIFO memory emulator 72 indicates the entry status of the actual display FIFO memory 70 from a fill and drain standpoint. The virtual FIFO controller 68 includes a software based drain rate determinator 80 that determines a constant drain rate for the display FIFO memory based on display mode data entered by a user. The FIFO management system determines a new constant drain rate for each display mode. The programmable FIFO emulator 72 processes the programmable constant drain rate data determined by the drain rate determinator 80 for use in determining the number of entries remaining in the display FIFO memory 70.

To determine the constant drain rate, the drain rate determinator 80 receives information from a user upon initialization of the computer system as prompted by a software interface module. The information entered by the user for use by the drain rate determinator 80 includes the size of the display screen 40, the refresh rate, and color depth information. Based upon the following formula, the drain rate for the display FIFO memory 70 is calculated by the drain rate determinator 80: XCLK_PER_QWORD=VCLK(in MHZ) XCLK(in MHZ)*64/bit_per_pixel. A look up table stores VCLK speed values determined by the display screen size data and entered refresh rate.

The determined constant drain rate is stored in read rate register 74 which is then accessed by the programmable FIFO memory emulator 72. The programmable FIFO emulator 72 includes a programmable timer/counter 82 with programmable precision to accommodate varying bandwidths of display modes. The programmable timer/counter 82 is used in determining the number of entries remaining and allows the virtual FIFO controller 68 to accommodate varying screen display modes such as if a user wishes to connect a different screen that may have higher resolution. Therefore, drain rate determinator 80 includes a counter/timer precision determinator 84 that varies the resolution of the counter/timer 82 dependent upon the determined constant drain rate information. For example, a fixed bit length binary counter/timer is used with a programmable decimal point so that both the requirement of a large range and a low bandwidth displace mode can be accommodated as well as high accuracy of a high bandwidth display mode. The programmable counter/timer shifts the decimal point according to each display mode. The counter/timer 82 may be configured to be a counter or a timer. As a counter, it may count the number of entries remaining in the actual FIFO memory 70. As a timer, it may count the number of clock cycles necessary to drain the FIFO memory 70.

The drain rate determinator 80 outputs drain rate information and resolution parameters for setting the programmable timer/counter 82 shown by signal line 86. The programmable FIFO emulator 72 receives the drain rate data and resolution parameter data 86 and stores the drain rate data in register 78 and programs the programmable counter/timer 82 accordingly. The programmable FIFO emulator 72 predicts the number of entries left in the display FIFO memory 70 before a complete FIFO memory drain occurs. A time remaining signal (tDRAIN) 88 representing the time remaining before a drain occurs is sent to a virtual FIFO control unit 90 that compares the time remaining, to drain 88 to a preset threshold or watermark. Through the programmable FIFO emulator 72 and virtual FIFO control block 90, the virtual FIFO controller 68 maps the number of data entries stored in the display FIFO memory 70 to a number of memory clock cycles corresponding to the data entries held in the display FIFO memory 70.

The timer/counter 82 maps the number of data entries stored in display FIFO memory 70 to the number of memory clock cycles held in the display FIFO memory. The mapping occurs based upon the following formulas:

(1) XCLK_PER_QWORD=VCLK(in MHZ)XCLK(in MHZ) * 64/bit_per_pixel; and (2) TOTAL_XCLK_IN_FIFO=XCLK_PER_QWORD * NUMBER_OF_FIFO ENTRY.

Formula (1) shows that each entry (in the case where a word is 64 bits wide, otherwise referred to as a Quad word) of display FIFO memory is mapped to the number of memory clock cycles or XCLKs required in time for a given display mode. Formula (2) shows the total number of XCLKs the display FIFO memory can hold based on the XCLK_PER_QWORD. Accordingly, the display FIFO emulator 72 continually shows how many memory clocks are left over before the display FIFO memory 70 needs refilling, without using read and write pointer comparison methods.

The operation of the timer/counter 82 in the display FIFO memory emulator 72 is preferably as follows. For every clock cycle, the counter/timer 82 subtracts 1 count or decrements 1 count because the display FIFO memory loses 1 XCLK stored in it. For every entry filled into the display FIFO memory 70, the counter/timer is automatically incremented by a number that is equivalent to the number of XCLKs gained by adding an entry of data because the display FIFO memory gains XCLK_PER_QWORD of clock cycles of time for each entry filled.

The accuracy and range of the timer/counter is programmable. The range of the counter/timer 82 should be designed so that it can hold the maximum number of XCLK cycles that the total number of display FIFO memory entries can map to. The accuracy of the timer is of concern because in most cases the VCLK to XCLK ratio is not an exact number of XCLKs per entry so an error can be introduced. The accuracy of the counter/timer 82 should be such, that at the end of each display line the accumulated error should be less than one FIFO entry equivalent of XCLKs to guarantee that the display FIFO memory 70 does not overflow or under flow due to the accumulated error in the counter/timer 82. The accuracy requirement is at the highest for the highest bandwidth display mode because this display mode has the maximum number of display FIFO memory fill requests that will accumulate the maximum amount of error. The maximum range of the counter/timer 82 occurs at the lowest bandwidth displays mode since each display FIFO memory entry can map to the maximum numbers of XCLK cycles. The design of the preferred counter/timer 82 takes advantage of the fact the maximum accuracy and maximum angle for the counter/timer 82 does not happen in the same displays mode. The high bandwidth display mode has a high accuracy requirement but a small range, and the low bandwidth display mode needs a large range for the timer but has a low accuracy requirement.

Therefore, the programmable FIFO emulator 72 preferably uses a fixed bit length binary counter/timer 82 with a programmable decimal point that can meet both requirements of a large range for a low bandwidth display mode and high accuracy for the high bandwidth display mode by shifting the decimal point according to each display mode. However, it will be recognized by those of ordinary skill in the art, that other types of timer/counters can also be used.

Figure 4:
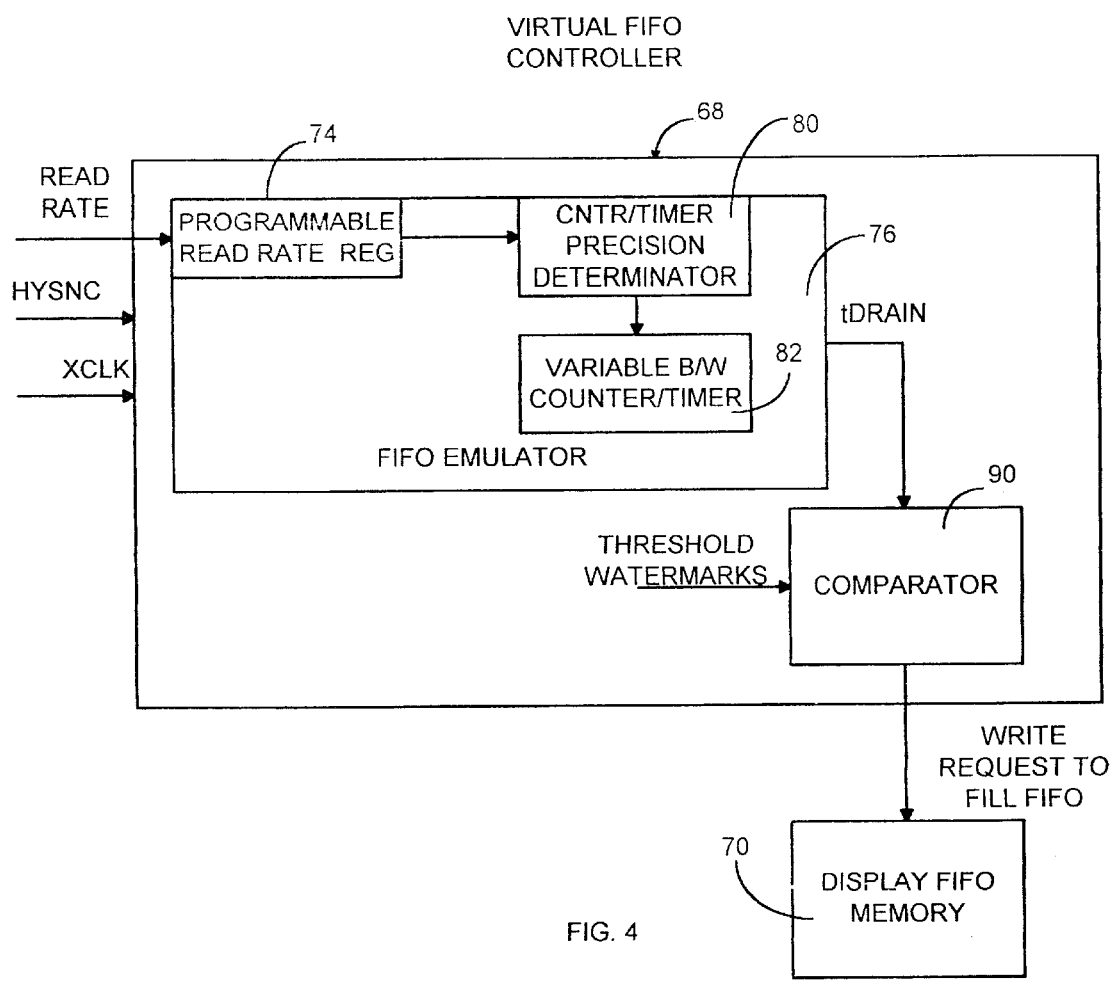
FIG. 4 is a block diagram depicting in another form, a virtual FIFO in accordance with the invention.

Referring to FIG. 4, the virtual FIFO controller 68 receives the HSYNC signal 44 as well as the XCLK signal 22 for use in determining when to send a write request to fill the display FIFO memory 70. The HYSNC signal 44 allows the virtual FIFO controller 68 to determine a start of a display request and an end of a display request. As shown, the programmed read rate information in the register 74 is used to modify the counter/timer 82 resolution by the precision determinator 80.

Figure 5:
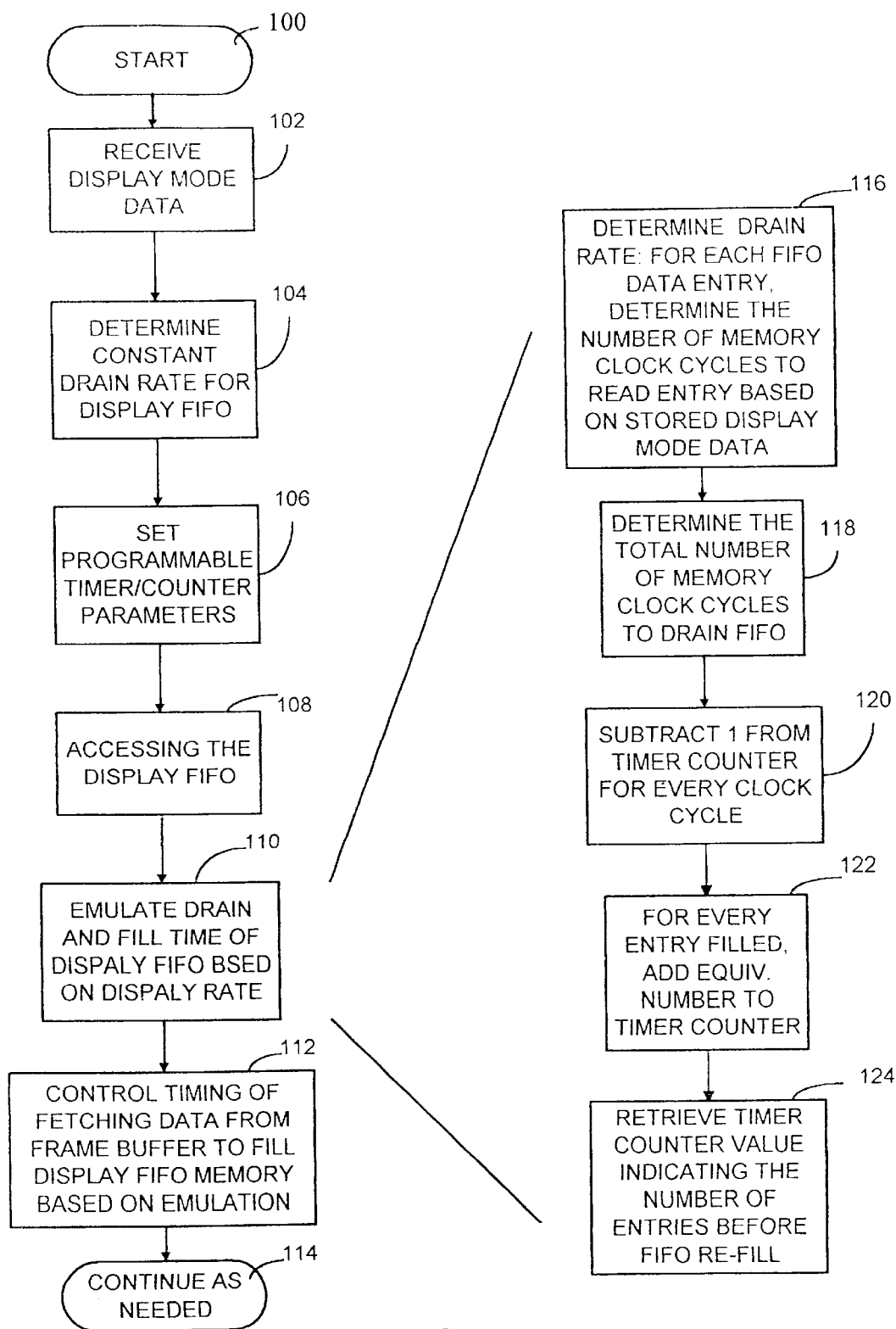
FIG. 5 is a flow diagram generally depicting a method of FIFO memory management in accordance Math an embodiment of the invention.

Referring to FIG. 5 and FIG. 3, the virtual FIFO controller 68 operates as indicated in step 100 by a user entering display mode data through a keyboard or other input device upon software prompting through a user interface (not shown.) The virtual FIFO controller 68 receives the display mode data as indicated in step 102. Next, the virtual FIFO controller 68 determines the constant drain rate for the display FIFO memory 70 as indicated in step 104. Once the constant drain rate data has been determined in software for the display mode of the particular screen, the information is stored in the programmable drain rate register 74. The virtual FIFO controller 68 uses the drain rate (read rate) resister value to set the bandwidth (i.e., the decimal positions) of the programmable timer/counter 82 in the FIFO emulator 72 as shown in block 106.

As shown in block 108, the virtual FIFO controller 68 accesses the display FIFO memory 70 by virtue of display memory read request signal 62 and write request signal 28 to control the information obtained from memory and written to fill the FIFO 70. The write request signal 28 is used by the virtual FIFO controller 68 to determine the ending point of the request signal 28.

Once the virtual FIFO controller 68 has access to the constant drain rate information from the register 74 and once the timer/counter bandwidth has been set for the particular display mode, the virtual FIFO controller 68 then begins to emulate the display memory FIFO 70 as indicated in block 110. Based on the emulation of the memory FIFO 70, the virtual FIFO controller controls the timing of write requests 28 to the display FIFO memory 70 as indicated in block 112. When the virtual FIFO controller 68 determines that additional pixel data needs to be written to the FIFO memory 70 for a screen refresh, a display memory request signal 62 is sent to the arbitrator 20 which then gives the real time display request signal 62 priority to obtain data from memory 16. When the pixel data from memory 16 is obtained, it is written under control of write request signal 28 to fill the memory FIFO memory 70. This process is continued as needed as indicated in step 114.

Referring back to step 110, the emulation of the drain and fill time of display FIFO memory 70 is accomplished by determining the drain rate for each FIFO data entry and by determining the number of memory clock cycles based on the stored displayed mode data entered by the user, as indicated in step 116. As shown by step 118, the virtual FIFO controller 68 under software control determines the total number of memory clock cycles to drain display FIFO memory 70 based on equations (1) and (2) above.

In operation the timer/counter 82 maps the number of data entries stored in the FIFO memory 70 to the number of memory clock cycles of data held in the memory FIFO memory 70. As shown by step 120, the counter/timer 82 subtracts 1 for every clock cycle indicative of a drained entry. For ever entry filled into the actual FIFO memory 70, the timer/counter 82 is incremented by a number that is equivalent to the number of memory clocks gained by adding an entry of data, based on the request signal 28.

The virtual FIFO controller retrieves the timer/counter value indicating the number of entries before FIFO memory 70 requires refilling as indicated in step 124. The timer/counter value is compared to the watermark threshold by comparator 90 (FIG. 4). If the timer/counter value indicates the number of entries is above the threshold, no write request is initiated. However, if the timer/counter is at or below the threshold watermark, indicating that the FIFO memory 70 needs to be filled, a write request is generated by the virtual FIFO controller 68.

Figure 6:
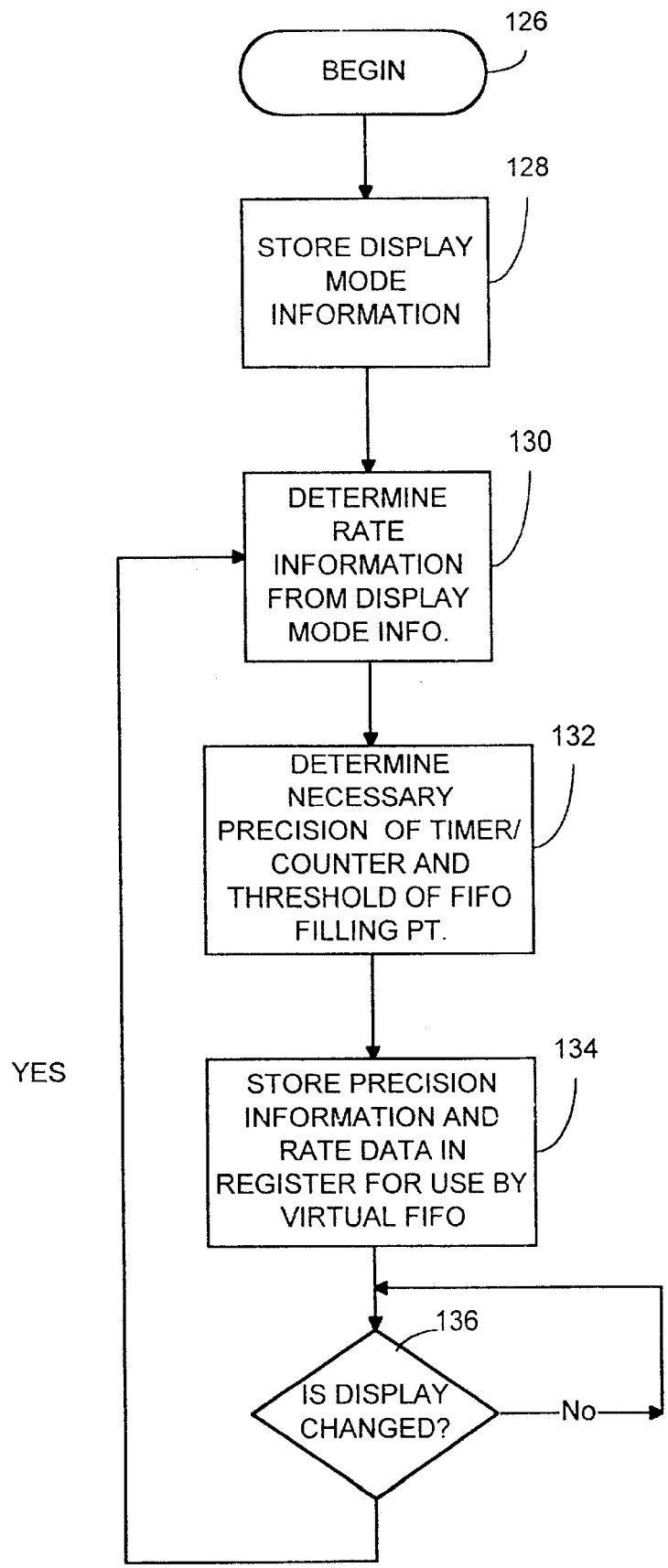
FIG. 6 is a block diagram generally depicting a method for obtaining initial data for use in the method and system of the FIFO memory management system in accordance with an embodiment of the invention.

FIG. 6 further depicts the steps performed during initial setup to enter the display mode information. As indicated in step 126, a user is prompted to enter display mode information so that the virtual FIFO management system can determine the constant drain rate data for the virtual FIFO controller 68. The display mode information is stored as shown in step 128. The virtual FIFO memory management system determines the rate information from the display mode information as indicated in step 130. Once the drain rate information has been determined the precision of the timer/counter and the threshold of the FIFO filing point are determined as indicated in step 132. The precision information and rate data are stored for use by the virtual FIFO controller as indicated in step 134. The virtual FIFO management system also continues to check whether the display mode information entered in block 128 has changed indicating a different screen or graphic system has been connected to the FIFO memory management system. If the display mode information has changed, a new drain rate is determined as indicated by block 130. If however no display mode information has changed, no further action is taken as indicated in step 136.

Figure 7:
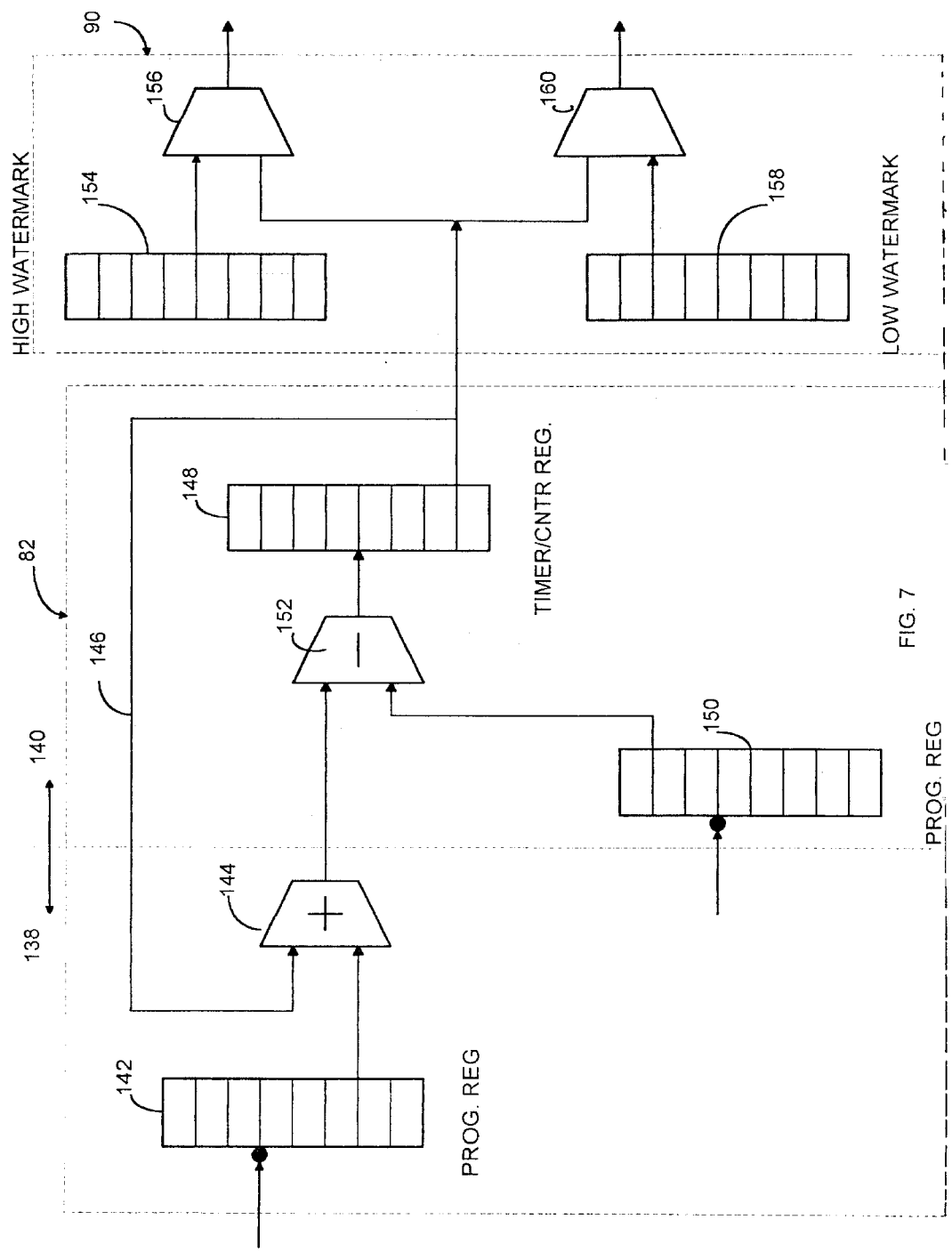
FIG. 7 is a block diagram showing one embodiment of a programmable timer/counter in accordance with the invention.

FIG. 7 shows the programmable timer/counter 82 having a fill emulator stage 138 and a drain emulator state 140. The fill emulator stage 138 includes a programmable decimal point register 142 (XCLK_PER_WORD) having a programmable decimal point to accommodate different bandwidths of display modes. The programmable decimal point register 142 contains the drain rate data. An adder 144 receives the drain rate data and current counter/timer data 146 (tDRAIN) from a counter/timer register 148. The adder 144 adds the two sets of data to increment the counter/timer register 148 upon every request to memory to fill the FIFO. Under software control, another programmable decimal point register 150 is automatically set to a corresponding decimal point level based on the setting of programmable decimal point register 142. The programmable register 150 contains a predefined drain subtraction value (preferably equal to 1 count) that is used in the drain emulation stage 140 to subtract one count for each clock cycle during a drain to emulate FIFO draining.

A subtracter 152 subtracts an output from the adder 144 and the drain subtraction value in register 150. The output from the subtracter 152 causes the counter/timer to increment or decrement. The counter/timer value 146 is compared in the virtual FIFO control block 90 to determine whether a fill FIFO request should activated or stopped. As shown, the virtual FIFO control block 90 includes a FIFO full register 154 for storing a high watermark indicating that the display FIFO is full. This data is compared in comparator 156 with the counter/timer data 146. When the counter/timer data 146 equals the high watermark, a display request shut off signal is generated so no additional data is requested from memory.

The virtual FIFO control block 90 also includes a low watermark register 158 containing a low watermark threshold value. This data is compared in comparator 160 with the counter/timer data 146. When the counter/timer data 146 is below the low watermark value, a display request activation signal is generated so additional data is requested from memory.

In summary, the above described system and method assumes that for each given display mode, the draining rate of the display FIFO memory for a screen refresh is a constant value. Based on this constant drain rate, a timer/counter (a virtual FIFO) can be built to emulate the draining and filling of the actual display FIFO memory. The counter/timer predicts the number of entries remaining in the display FIFO memory at each clock cycle based on the programmed constant drain rate. The disclosed approach substantially removes the uncertainty introduced by the conventional re-synchronization process needed for comparison of the read and write FIFO pointers. Two entries that were previously wasted by the re-synchronization are preserved. Also, the wasting of display FIFO memory entries due to memory access pipeline stages can also be eliminated by properly biasing the timer/counter.

It should be understood that the implementation of other variations and modifications of the invention in its various aspects will be apparent to those of ordinary skill in the art, and that the invention is not limited by the specific embodiments described. For example, the order of the above steps may be suitably rearranged as desired. It is therefore contemplated to cover by the present invention, any and all modifications, variations, or equivalents that fall within the spirit and scope of the basic underlying principles disclosed and claimed herein.

What is claimed is:

1. A display FIFO memory management system comprising:
   display FIFO memory operating at a predefined clock cycle, that stores display screen refresh data as a number of data entries;
   a programmable FIFO emulator that emulates a drain and fill time of the display FIFO memory on a clock cycle basis to automatically predict a number of data entries remaining in the display FIFO memory; and
   controller, responsive to the programmable FIFO emulator that controls the timing of write request signals to frame buffer memory to fill the display FIFO memory based on the prediction of the number of remaining data by the programmable emulator.

2. The memory management system of claim 1 wherein the programmable emulator processes programmable constant drain rate data of the display FIFO memory to determine the number of entries remaining.

3. The memory management system of claim 2 wherein the programmable emulator predicts the number of entries left before a complete FIFO drain occurs and further includes a controller that compares the predicted information to a predefined threshold by mapping the number of data entries stored in the display FIFO memory to a number of memory clock cycles corresponding to the data in the data entries held in the display FIFO memory.

4. The memory management system of claim 1 wherein the programmable emulator further includes a timer/counter with programmable precision to accommodate varying bandwidths of display modes.

5. The memory management system of claim 4 wherein the screen display modes are stored as screen display mode data for use by the emulation means.

6. The memory management system of claim 5 wherein the display mode data includes the size of the display, the frequency of a refresh request and color depth data.

7. The memory management system of claim 4 wherein the timer/counter with programmable precision includes a programmable register having drain rate data stored therein, a programmable register having drain subtraction data stored therein, a timer/counter register containing data representing a predicted amount of time remaining before the FIFO memory is drained, an adder connected to add data from the timer counter to data from the programmable memory having drain rate data stored therein, and a subtracter connected to receive an output from the adder and data from the programmable register having drain subtraction data stored therein wherein the timer/counter register is incremented or decremented based on output from the subtractor.

8. A display FIFO memory management system comprising:
   display FIFO memory operating at a predefined clock cycle, that stores display screen refresh data as a number of data entries;
   a controller that determines constant drain rate data for the display FIFO memory based on received display mode data;
   a programmable FIFO emulator that receives the drain rate data, and emulates a drain and fill time of the display FIFO memory to automatically predict a number of register entries remaining in the display FIFO memory at each predefined clock cycle by processing the constant drain rate data of the display FIFO memory to determine the number of entries remaining and further including a timer/counter with programmable precision to accommodate varying bandwidths of screen display modes; and
   a controller, operatively coupled to the programmable emulator, that controls timing of write request signals to frame buffer memory to fill the display FIFO memory based on the prediction by the programmable emulator.

9. The memory management system of claim 8 wherein the FIFO emulator further includes a controller that compares the predicted number of register entries to a predefined threshold by mapping the number of register entries stored in the display FIFO memory to a number of memory clock cycles held in the display FIFO memory.

10. The memory management system of claim 8 wherein the timer/counter determines a number of clock cycles remaining before the display FIFO is drained by subtracting 1 for every clock cycle and for every filled entry, incrementing the timer counter by a number equal to the number of memory clock cycles gained by adding an entry of data.

11. The memory system of claim 10 wherein the timer/counter includes a programmable register having drain rate data stored therein, a programmable register having drain subtraction data stored therein, a timer/counter register containing data representing a predicted amount of time remaining before the FIFO memory is drained, an adder connected to add data from the timer/counter to data from the programmable memory having drain rate data stored therein, and a subtracter connected to receive an output from the adder and data from the programmable register having drain subtraction data stored therein wherein the timer/counter register is incremented or decremented based on output from the subtractor.

12. A display FIFO memory management method comprising:

accessing a display FIFO memory operating at a predefined clock cycle, that stores display screen refresh data as a number of data entries;

emulating a drain and fill time of the display FIFO memory, on a clock cycle basis, to automatically predict a number of register entries remaining in the display FIFO memory; and controlling a timing of write request signals to frame buffer memory to fill the display FIFO memory based on the prediction of the number of remaining data entries.

13. The method of claim 12 including the steps of receiving display mode data and determining constant drain rate data for the display FIFO memory based on the received display mode data.

14. The method of claim 13 wherein the step of emulating includes predicting the number of entries left before a complete FIFO drain occurs and further includes comparing the predicted info nation to a predefined threshold by mapping the number of data entries stored in the display FIFO memory to a number of memory clock cycles corresponding to the data in the data entries held in the display FIFO memory.

15. The method of claim 13 further including the steps of prompting a user for entry of the display mode data, and storing the display mode data for use in determining constant drain rate data.

16. The method of claim 12 further including the step of providing a timer/counter with programmable precision to accommodate varying bandwidths of screen display modes for use in determining the number of entries remaining so that emulation can accommodate varying screen display modes.

17. The method of claim 16 wherein the timer/counter with programmable precision facilitates the determination of a number of clock cycles remaining before the display FIFO is drained by subtracting 1 for every clock cycle and for every filled entry, incrementing the timer counter by a number equal to the number of XCLKS gained by adding an entry of data.

* * * * *